(12) United States Patent
Kim et al.

(10) Patent No.: US 8,427,432 B2
(45) Date of Patent: Apr. 23, 2013

(54) ZOOM CONTROL FOR A DISPLAY SCREEN OF A MOBILE COMMUNICATION TERMINAL

(75) Inventors: Tae Hun Kim, Incheon (KR); Pil Gyun Kang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 892 days.

(21) Appl. No.: 12/249,885

(22) Filed: Oct. 10, 2008

(65) Prior Publication Data
US 2009/0098912 A1 Apr. 16, 2009

(30) Foreign Application Priority Data

Oct. 10, 2007 (KR) .................. 10-2007-0101958

(51) Int. Cl.
*G06F 3/041* (2006.01)
(52) U.S. Cl.
USPC .......................................... 345/173; 455/566
(58) Field of Classification Search .................. 345/173, 345/156
See application file for complete search history.

(56) References Cited

U.S. PATENT DOCUMENTS

| | | | |
|---|---|---|---|
| 5,596,346 A | 1/1997 | Leone et al. | |
| 5,923,908 A * | 7/1999 | Schrock et al. | ................. 396/85 |
| 6,919,927 B1 * | 7/2005 | Hyodo | ..................... 348/333.02 |
| 2002/0149605 A1 * | 10/2002 | Grossman | ..................... 345/660 |
| 2006/0031010 A1 | 2/2006 | Friedrich | |
| 2007/0097090 A1 * | 5/2007 | Battles | .......................... 345/173 |
| 2007/0097151 A1 | 5/2007 | Rosenberg | |

FOREIGN PATENT DOCUMENTS

EP 0651543 9/2008

OTHER PUBLICATIONS

German Patent and Trademark Office Application Serial No. 10200805119.6, Office Action dated Oct. 15, 2012, 6 pages.

* cited by examiner

*Primary Examiner* — Amare Mengistu
*Assistant Examiner* — Shawna Stepp Jones
(74) *Attorney, Agent, or Firm* — Lee, Hong, Degerman, Kang & Waimey

(57) ABSTRACT

A user interface system for controlling size of content displayed on a display screen of a limited display device is provided. The user interface system comprises a first user interface for selecting a first point on the display screen; and a second user interface for performing a resizing operation on content displayed on the display screen using the first point as a center of reference for purpose of performing the resizing operation, wherein the resizing operation is performed in response to user interaction with the first user interface and the second user interface.

33 Claims, 12 Drawing Sheets

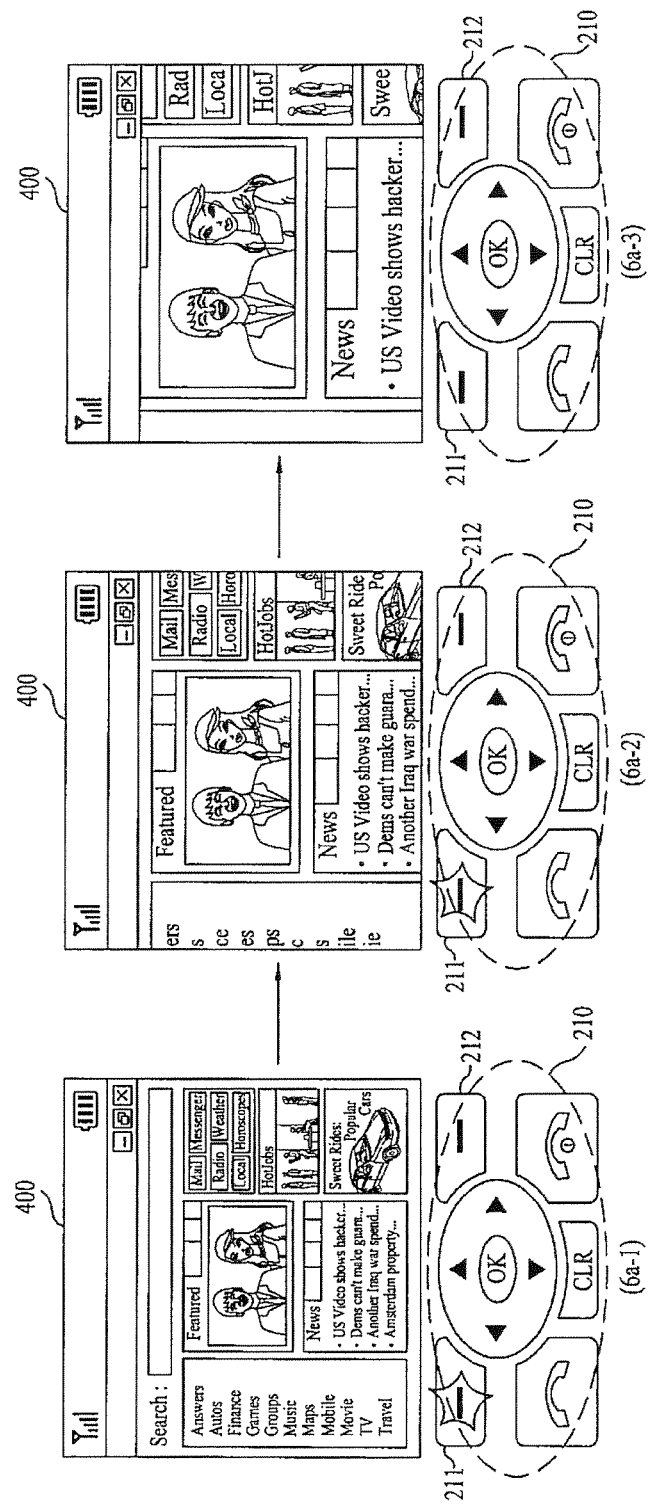

ZOOM CONTROL FOR A DISPLAY SCREEN OF A MOBILE COMMUNICATION TERMINAL

CROSS-REFERENCE TO RELATED APPLICATIONS

This application claims the benefit of earlier priority date and right of priority to Korean Patent Application No. 10-2007-0101958, filed on Oct. 10, 2007, which is hereby incorporated by reference in its entirety.

TECHNICAL FIELD

The present invention relates generally to a mobile terminal and, more particularly, to controlling zoom on a touchscreen of a mobile terminal.

BACKGROUND

A mobile terminal is a device which may be configured to perform various functions. For example, a mobile terminal may be configured to display media content via a display screen, play media content, support data and voice communications, capture images and video via a camera, record audio, receive media content via broadcast or multi cast signals, support game playing, or perform other functions.

Functionality of a mobile terminal may be increased by improving software, hardware, or other components of the mobile terminal. Recent improvements, for example, allow a large image to be displayed quickly on a display screen of the mobile terminal for viewing by a user.

Unfortunately, a large image may be displayed as a small, high-resolution image on a display screen of a mobile terminal if the display screen is too small to fit the entire image. Thus, a user may frequently zoom in or zoom out to view the image. Accordingly, systems and methods are needed that to overcome the above-mentioned shortcomings.

SUMMARY

The present disclosure is directed to controlling zoom on a touchscreen of a mobile terminal so that a user may view content on a touchscreen more conveniently.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a mobile terminal is provided. The mobile terminal comprises a touchscreen for displaying content on the mobile terminal; a zoom adjuster for providing one or more zoom-related functions to a user; and a control unit for controlling zooming on the content displayed on the touchscreen, in response to the user selecting a zoom function provided by the zoom adjuster and touching of a point on the touchscreen, wherein the zooming is performed according to a touched point on the touchscreen.

In accordance with another embodiment, a method for controlling zoom on a touchscreen of a mobile terminal is provided. The method comprises displaying content on the mobile terminal; providing one or more zoom-related functions to a user; and zooming on the content displayed on the touchscreen, in response to the user selecting a zoom function provided by the zoom adjuster and touching a point on the touchscreen, wherein the zooming is executed according to the touched point on the touchscreen.

In accordance with yet another embodiment, a user interface system for controlling size of content displayed on a display screen of a limited display device is provided. The user interface system comprises a first user interface for selecting a first point on the display screen; and a second user interface for performing a resizing operation on content displayed on the display screen using the first point as a center of reference for purpose of performing the resizing operation, wherein the resizing operation is performed in response to user interaction with the first user interface and the second user interface.

It should be understood that both the foregoing summary and the following detailed description are exemplary and explanatory and are intended to provide further explanation of the claimed subject matter.

BRIEF DESCRIPTION OF THE DRAWINGS

The accompanying drawings, which are incorporated in and constitute a part of this application, illustrate one or more embodiments and, together with the description, serve to provide a better understanding of the claimed subject matter. In the drawings:

FIGS. 6A and FIG. 6B are state diagrams for a display screen of a mobile terminal, in accordance with one or more embodiments.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following description, the terms "module," "unit," and "part are utilized to refer to various components for purposes of facilitating disclosure. Therefore, it should be understood that such terms are not significant in and of themselves and are not intended to limit the scope of the present disclosure.

Figure 1:
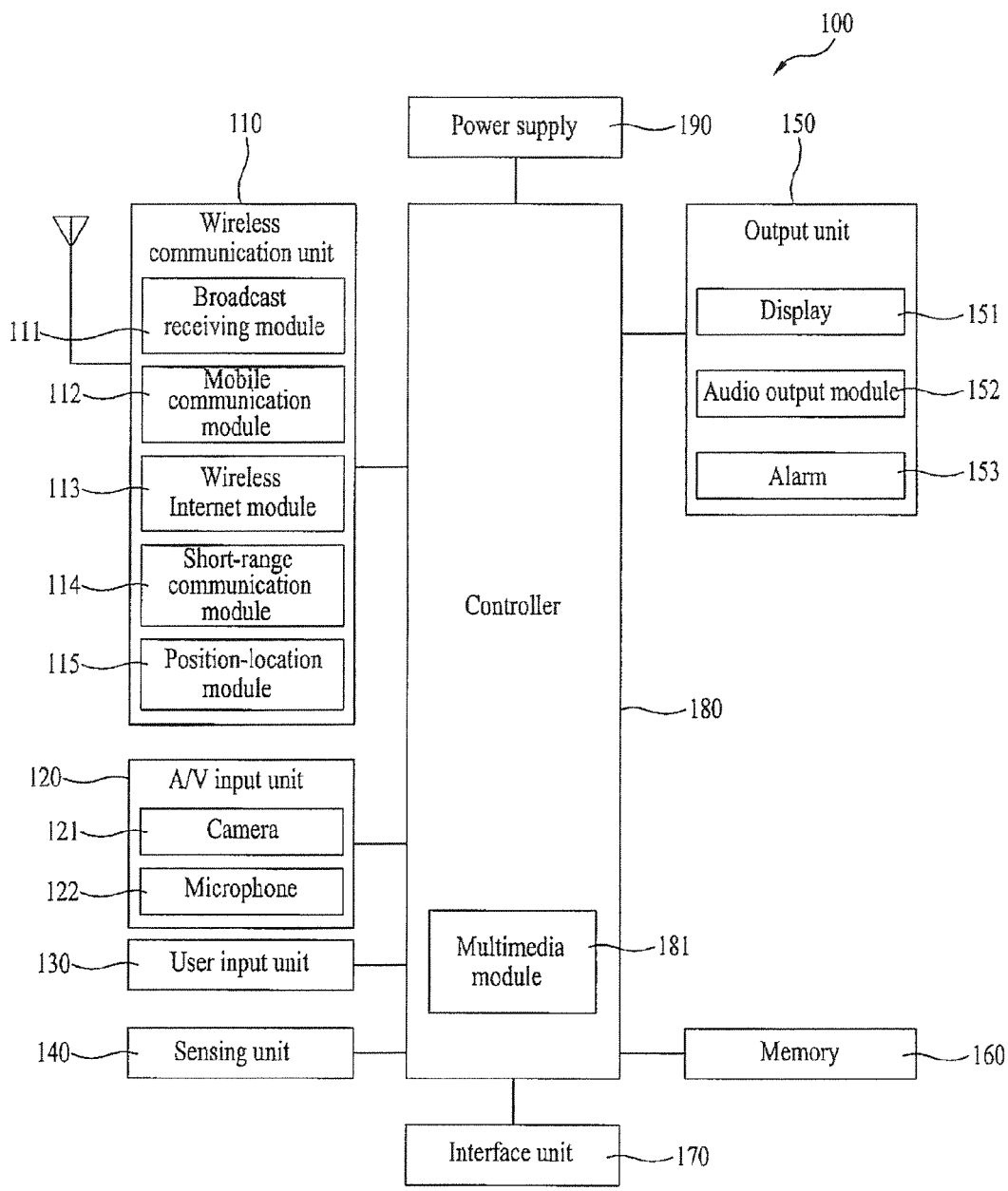
FIG. 1 is a block diagram of a mobile terminal, in accordance with one embodiment.

FIG. 1 is a block diagram of a mobile terminal 100, in accordance with one embodiment. Mobile terminal 100 may be one of a variety of different types of terminals. The different types of terminals may included, but are not limited to, mobile phones, user equipment, smart phones, laptops, digital broadcast terminals, personal digital assistants, portable multimedia players (PMP), navigation systems, or other mobile devices. It is noteworthy that, in other embodiments, mobile terminal 100 may be a non-mobile device such as a general computer. Also, depending on configuration, mobile terminal 100 may not include all the illustrated components or may comprise other components for additional functionality or utility.

Wireless communication unit 110 comprises several components that permit wireless communication between mobile terminal 100 and a wireless communication system or network within which mobile terminal 100 is connected. In accordance with one embodiment, broadcast receiving module 111 receives a broadcast signal from an external broadcast managing entity via a broadcast channel. The broadcast channel may be a satellite channel or a terrestrial channel. The broadcast managing entity may be a digital multimedia broadcasting-terrestrial (DMB-T), digital multimedia broadcasting-satellite (DMB-S), digital video broadcast-handheld (DVB-H), media forward link only (MediaFLO®), integrated services digital broadcast-terrestrial (ISDB-T), or other broadcasting system.

The broadcast signal may include information associated with a broadcast channel, a broadcast program, a broadcast service provider, an electronic program guide (EPG) of digital multimedia broadcasting (DMB), electronic service guide (ESG) of digital video broadcast-handheld (DVB-H), or other information provided by a broadcast managing entity. The broadcast signal may be implemented as a TV broadcast signal, a radio broadcast signal, a data broadcast signal, or other type of signal. Depending on implementation, the broadcast signal may combine one or more types of signals (e.g., TV broadcast signal with a radio broadcast signal).

The broadcast receiving module 111 may be configured to receive broadcast signals transmitted from various types of broadcast managing entities. For example, broadcast receiving module 111 may receive broadcast signals from digital multimedia broadcasting-terrestrial (DMB-T), digital multimedia broadcasting-satellite (DMB-S), digital video broadcast-handheld (DVB-H), media forward link only (MediaFLO®), integrated services digital broadcast-terrestrial (ISDB-T), multicasting systems, or other broadcasting systems. Depending on implementation, information received by broadcast receiving module 111 may be stored in memory 160 of mobile terminal 100 or an external storage device.

In accordance with one embodiment, mobile communication module 112 may transmit or receive wireless signals, respectively, to or from one or more network entities (e.g., base station, Node-B). Such signals may comprise audio, video, multimedia, control signaling, or other types of data or information. Wireless internet module 11 3 is internally or externally coupled to mobile terminal 100. In accordance with one embodiment, wireless internet module 113 may provide Internet access to mobile terminal 100 using technology such as WLAN (Wireless LAN or Wi-Fi), Wibro (Wireless broadband), Wimax (World Interoperability for Microwave Access), IISDPA (High Speed Downlink Packet Access), or other wireless technology.

In accordance with one embodiment, short-range communication module 114 may facilitate short-range communications. Mobile terminal 100 may communicate with devices connected to mobile terminal 100 in a short-range network using short-range technology such as radio frequency identification (RFID), infrared data association (IrDA), ultra-wideband (UWB), Bluetooth®, ZigBee®, or other short-range technology. Position-location module 115 may determine the location of mobile terminal 100. Depending on implementation, position-location module 115 may use one or more positioning technologies to locate mobile terminal 100. For example, position-location module 115 may use global positioning system (GPS) components which cooperate with associated satellites, network components, and combinations thereof.

Audio/video (A/V) input unit 120 comprises a camera 121 a microphone 122 for providing audio or video signal input to mobile terminal 100. In accordance with one embodiment, camera 121 may receive and process image frames of still pictures or video. Microphone 122 may receive an external audio signal while terminal mobile 100 is in a particular mode (e.g., calling mode, recording mode, voice recognition mode, or other mode). The received signal may be processed and converted into digital data. In some embodiments, noise generated in the course of receiving the signal may be removed using assorted noise removing algorithms.

Data thus generated by the A/V input unit 120 may be stored in memory 160, utilized by output unit 150, or transmitted via one or more modules of wireless communication unit 110. It is noteworthy that A/V input unit 120 may comprise more than one camera or microphone. In accordance with one embodiment, user input unit 130 may generate input data in response to user interaction with one or more user interfaces of mobile terminal 100. The user interfaces may comprise a keypad, a dome switch, a touchpad (e.g., static pressure or capacitance), a touch screen, a 3-way key, a jog wheel, a jog switch, a jog or shuttle switch or other user interface.

Sensing unit 140 may monitor the status one or more components of mobile terminal 100. Sensing unit 140 may detect an open or close status of mobile terminal 100, relative positioning of components (e.g., between a display and a keypad) of mobile terminal 100, a change of position of mobile terminal 100 or a component of mobile terminal 100, a presence or absence of user contact or interaction with mobile terminal 100, orientation, acceleration, or deceleration of mobile terminal, the presence or absence of power provided by power supply 190, the presence or absence of a coupling or connection between interface unit 170 and another device, or other changes.

For example, if mobile terminal 100 is a slide-type, sensing unit 140 may sense whether a sliding portion of mobile terminal 100 is open or closed. Interface unit 170 may couple or connect mobile terminal 100 with external devices such as wired or wireless headphones, external chargers, power supplies, storage devices configured to store data (e.g., audio, video, pictures, or other data), earphones, microphones, or other external devices. Interface unit 170 may use a wired or wireless data port, a card reader (e.g., for coupling or connecting to a memory card), a subscriber identity module (SIM) card, a user identity module (UIM) card, a removable user identity module (RUIM) card), audio input/output ports, video input/output ports, or other connection interfaces to couple or connect mobile terminal 100 with an external device.

Output unit 150 comprises various components for supporting output of information in mobile terminal 100. Output unit 150 comprises display 151, which supports visual output from mobile terminal 100, in accordance with one embodiment. For example, if mobile terminal 100 is in a calling mode, display 151 may provide one or more screens for placing, conducting, or terminating a phone call. If, for example, mobile terminal 100 is in a video call mode or a photographing mode, display 151 may display images associated with the current mode.

In some embodiments, display 151 may also be configured for input, in addition to output. For example, display 151 may be configured as a touch screen working in cooperation with another user input unit 130 such as a touchpad. Depending on implementation, display 151 may output information using technology such as a liquid crystal display (LCD), a thin film transistor-liquid crystal display (TFT-LCD), an organic light-emitting diode display (OLED), a flexible display, a three-dimensional display, or other display technology. It is noteworthy that mobile terminal 100 may comprise more than one display. For example, mobile terminal 100 may comprise two displays, an internal display that is viewable when mobile terminal 100 is in an open state and an external display that is viewable in both open and closed states.

Output unit 150 further comprises audio output module 152, which supports audio output from mobile terminal 100, in accordance with one embodiment. Audio output module 152 may be configured to output audio using one or more speakers, buzzers, other audio producing devices, or combinations thereof. Audio output module 152 may output different types of audio according to different events or modes. The events may comprise call received, message received, error, user interaction, or other event associated with mobile terminal 100. The modes may comprise a call-receiving mode, a call-placing mode, a recording mode, a voice recognition mode, a broadcast reception mode, or other modes defined for mobile terminal 100.

Output unit 150 further comprises alarm 153, which may signal or otherwise identify the occurrence of an event, in accordance with one embodiment. For example, alarm 153 may be configured to vibrate in response to mobile terminal 100 receiving a call or message. Alarm 153 may also be configure to vibrate in response to receiving user interaction with mobile terminal 100, to provide a tactile feedback mechanism, for example. It should be understood that the various output provided by components of output unit 150 may be performed separately or using a combination of the components.

In accordance with one embodiment, memory 160 may store data such as program instructions for applications operating on mobile terminal 100, contact information, messages, pictures, video, or other information. Memory 160 may comprise volatile memory, non-volatile memory, or storage devices such as random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other memory or storage device.

In accordance with one embodiment, controller 180 may control the overall operations of mobile terminal 100. For example, controller 180 may perform the controlling and processing associated with voice calls, data communications, instant message communication, video calls, camera operations, recording, or other operations. In accordance with one embodiment, controller 180 may include a multimedia module 181, which provides multimedia playback. In other embodiments, multimedia module may be configured as a separate component of mobile terminal 100.

Power supply 190 provides internal power, external power, or combinations thereof for mobile terminal 100. Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software may be written in any suitable programming language, stored in memory (e.g., memory 160), and executed by a controller or processor (e.g., controller 180). Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However, the embodiments disclosed herein apply equally to other types of terminals.

Figure 2:
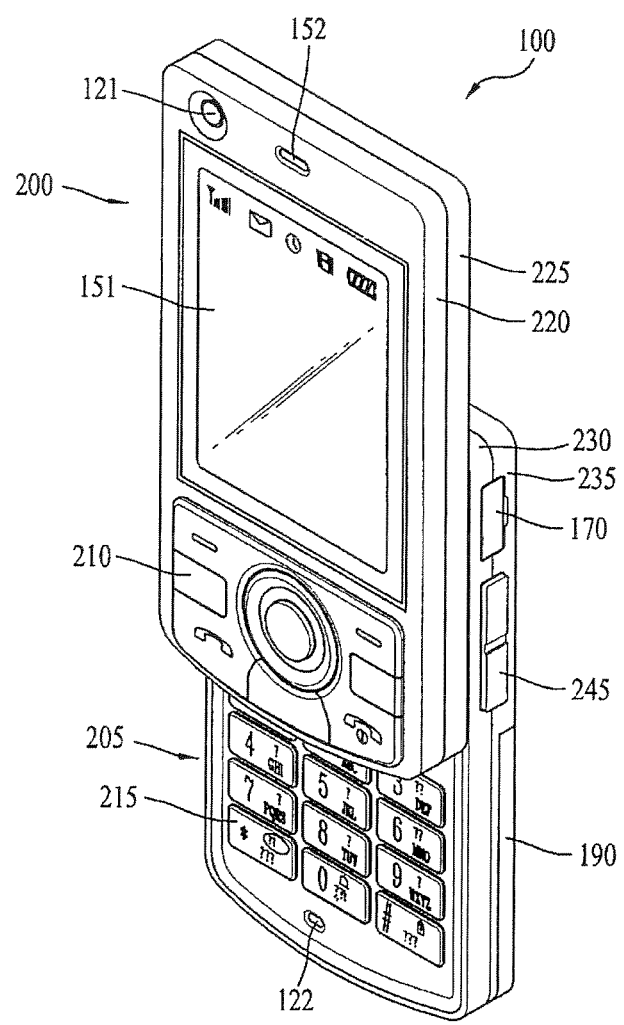
FIG. 2 is a perspective view of a front side of a mobile terminal, in accordance with one embodiment.

FIG. 2 is a perspective view of a front side of a mobile terminal according to an embodiment of the present invention, in accordance with one embodiment. Referring to FIGS. 1 and 2, mobile terminal 100 comprises a first body 200 configured to slide over a second body 205. User input unit 130 comprises a first user interface such as the touchpad and function keys 210, a second user interface such as keypad 215, and a third user interface such as side keys 245. Function keys 210 are associated with first body 200, and keypad 215 is associated with second body 205. Keypad 215 includes various keys (e.g., numbers, characters, and symbols) to enable a user to place a call, prepare a text or multimedia message, or perform other actions using mobile terminal 100.

First body 200 slides relative to second body 205 between open and closed positions. In the closed position, first body 200 is positioned over second body 205 such that keypad 215 is substantially or completely covered by first body 200. In the open position, a user may access keypad 215, as well as display 151 and function keys 210. A user may use function keys 210 to conveniently enter commands such as start or send, stop or end, scroll, or other commands. As provided earlier, mobile terminal 100 may operate in one or more modes. In accordance with one embodiment, mobile terminal 100 may operate in a standby mode when in the closed position and in an active mode when in the open position. This mode configuration may be changed as desired.

First body 200 comprises a first case 220 and a second case 225, and second body 205 comprises a first case 230 and a second case 235. Depending on the type of case, the first and second cases may be formed using a ridge material such as injection molded plastic, metallic material such as stainless steel (STS) or titanium (Ti), or other type of material. One or more intermediate cases may be inserted between the first and second cases of one or both of first and second bodies 200, 205. First and second bodies 200, 205 may be sized according to the size of components included mobile terminal 100.

First body 200 comprises a camera 121 and an audio output unit 152, which is configured as a speaker, and positioned relative to a display 151. In other embodiments, the camera 121 may be selectively positioned relative to first body 200 such that a user may rotate, swivel, or otherwise position the camera 121 to take pictures or record video more conveniently. Function keys 210 are positioned adjacent to a lower side of the display 151, and the display 151 is as an LCD or OLED. As provided earlier, in accordance with one embodiment, the display 151 may be configured as a touchscreen having an underlying touchpad which generates signals responsive to user contact (e.g., finger, stylus, etc.) with the touchscreen.

Second body 205 comprises a microphone 122 positioned adjacent to keypad 215, and side keys 245 located along the side of second body 205. In one embodiment, side keys 245 may be configured as hot keys, such that side keys 245 are associated with a particular function of mobile terminal 100. An interface unit 170 is positioned adjacent to side keys 245, and a power supply 190 (e.g., a battery) is positioned on a lower portion of second body 205.

Figure 3:
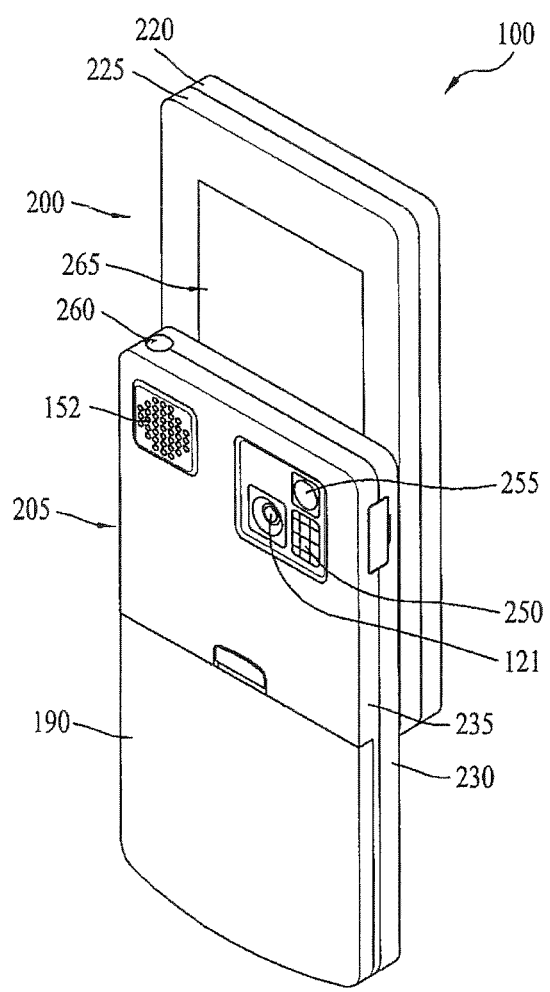
FIG. 3 is a rear view of the mobile terminal shown in FIG. 2, in accordance with one embodiment.

FIG. 3 is a rear view of the mobile terminal shown in FIG. 2, in accordance with one embodiment. In FIG. 3, second body 205 comprises a camera 121, an associated flash 250, and a mirror 255. Mirror 255 enables a user to more conveniently take pictures or videos with the camera 121 in a self-portrait mode. The camera 121 of second body 205 (FIG. 3) faces the direction opposite to the direction faced by the camera 121 of first body 200 (FIG. 2).

Depending on the type of camera, the cameras 121 may have different features or capabilities. For example, in accordance with one embodiment, the camera 121 of first body 200 may operate with a lower resolution than the camera 121 of second body 205 or vice versa. The lower resolution is advantageous in situations in which reverse link bandwidth capabilities are limited (e.g., during a video conference, while the higher resolution provides a user with the option to take higher quality pictures or videos for later use or for communicating to others.

Second body 205 further comprises an audio output module 152, which is configured as a speaker and located on an upper side of second body 205. In some embodiments, the audio output modules 152 of first and second bodies 200, 205, may cooperate to provide stereo output. Moreover, either or both of the audio output modules 152 may be configured to operate as a speakerphone.

A broadcast signal receiving antenna 260 is positioned at an upper end of the second body 205. Antenna 260 functions in cooperation with broadcast receiving module 111 (see FIG. 1). In accordance with one embodiment, antenna 260 may be configured to retract into second body 205. The rear side of first body 200 includes slide module 265, which slides over corresponding a slide module positioned on the front side of second body 205.

It should be understood that the illustrated arrangement of the various components of first and second bodies 200, 205, may be modified as desired. In general, some or all of the components of one body may alternatively be implemented on the other body. In addition, the location and relative positioning of such components are not critical to many embodiments, and as such, the components may be positioned at locations which differ from those shown by the representative figures.

Mobile terminal 100 may be configured to operate within a communication system which transmits data via frames or packets, including both wireless and wireline communication systems, and satellite-based communication systems. Such communication systems utilize different air interfaces or physical layers. Examples of such air interfaces utilized by the communication systems include frequency division multiple access (FDMA), time division multiple access (TDMA), code division multiple access (CDMA), universal mobile telecommunications system (UMTS), long term evolution (LTE) of the UMTS, or global system for mobile communications (GSM). By way of non-limiting example only, further description will relate to a CDMA communication system, but such teachings apply equally to other system types.

Figure 4:
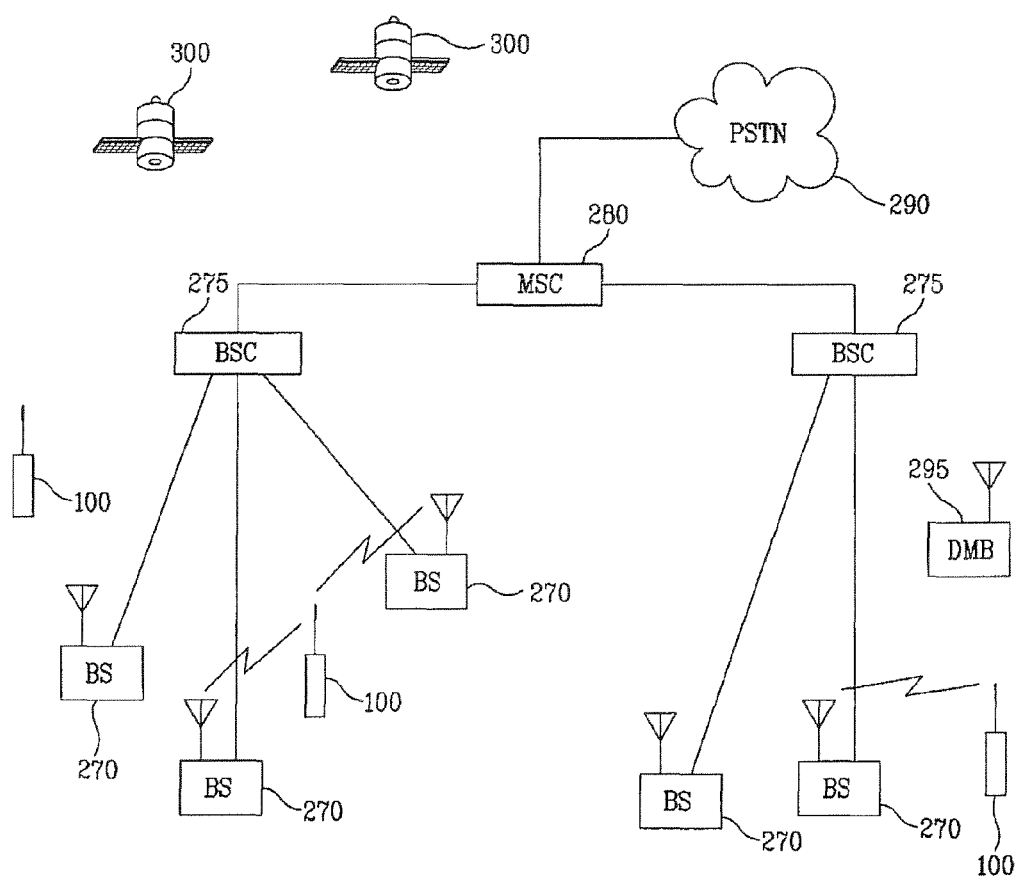
FIG. 4 is a block diagram of a CDMA (Code Division Multiple Access) wireless communication system operable with the mobile terminal of FIGS. 1-3, in accordance with one embodiment.

Referring now to FIGS. 1 and 4, a CDMA wireless communication system comprises a plurality of mobile terminals 100, a plurality of base stations 270, base station controllers (BSCs) 275, and a mobile switching center (MSC) 280. MSC 280 may be configured to interface with a conventional public switch telephone network (PSTN) 290. MSC 280 may also be configured to interface with BSCs 275. BSCs 275 are coupled to base stations 270 via backhaul lines. The backhaul lines may be configured in accordance with any of several known interfaces including, for example, E1/T1, ATM, IP, PPP, Frame Relay, HDSL, ADSL, or xDSL. It should be understood that the system may include more than two BSCs 275.

In accordance with one embodiment, each base station 270 may include one or more sectors, each sector having an omnidirectional antenna or an antenna pointed in a particular direction radially away from the base station 270. In other embodiments, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be referred to as "cell sites." Alternatively, individual sectors of a given base station 270 may be referred to as cell sites.

A terrestrial digital multimedia broadcasting (DMB) transmitter 295 is shown broadcasting to the mobile terminals 100 operating within the system. The broadcast receiving module 111 of a mobile terminal 100 is may be configured to receive broadcast signals transmitted by the DMB transmitter 295. Similar arrangements may be implemented for other types of broadcast and multicast signaling (as provided earlier).

FIG. 4 further depicts several global positioning system (GPS) satellites 300. Such satellites facilitate locating the position of some or all of the mobile terminals 100. Two satellites are depicted, but it should be understood that useful positioning information may be obtained with greater or fewer satellites. The position-location module 115 of a mobile terminal 100 may be configured to cooperate with the satellites 300 to obtain desired position information. In alternative embodiments, other types of position detection technology, (i.e., location technology that may be used in addition to or instead of GPS location technology) may be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to MSC 280, which provides additional routing services for interfacing with PSTN 290. Similarly, PSTN 290 interfaces with he MSC 280, and MSC 280 interfaces with the BSCs 275, which in turn control the base stations 270 to transmit sets of forward-link signals to the mobile terminals 100.

Figure 5:
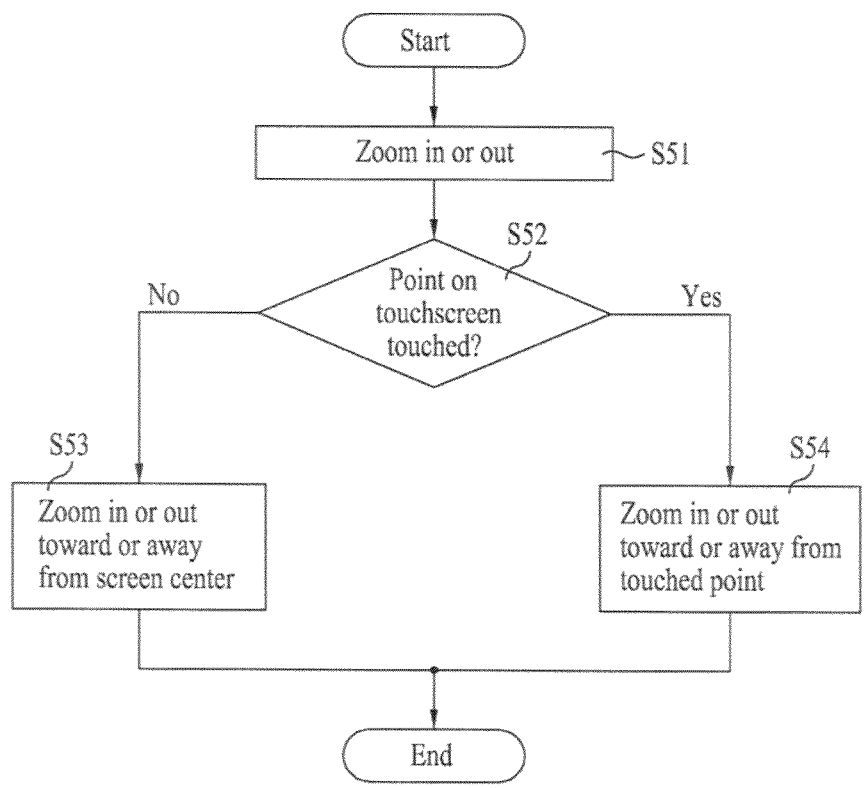
FIG. 5 is a flowchart of a method for controlling display of content on a touched of a mobile terminal, in accordance with one embodiment.
Figure 6B:
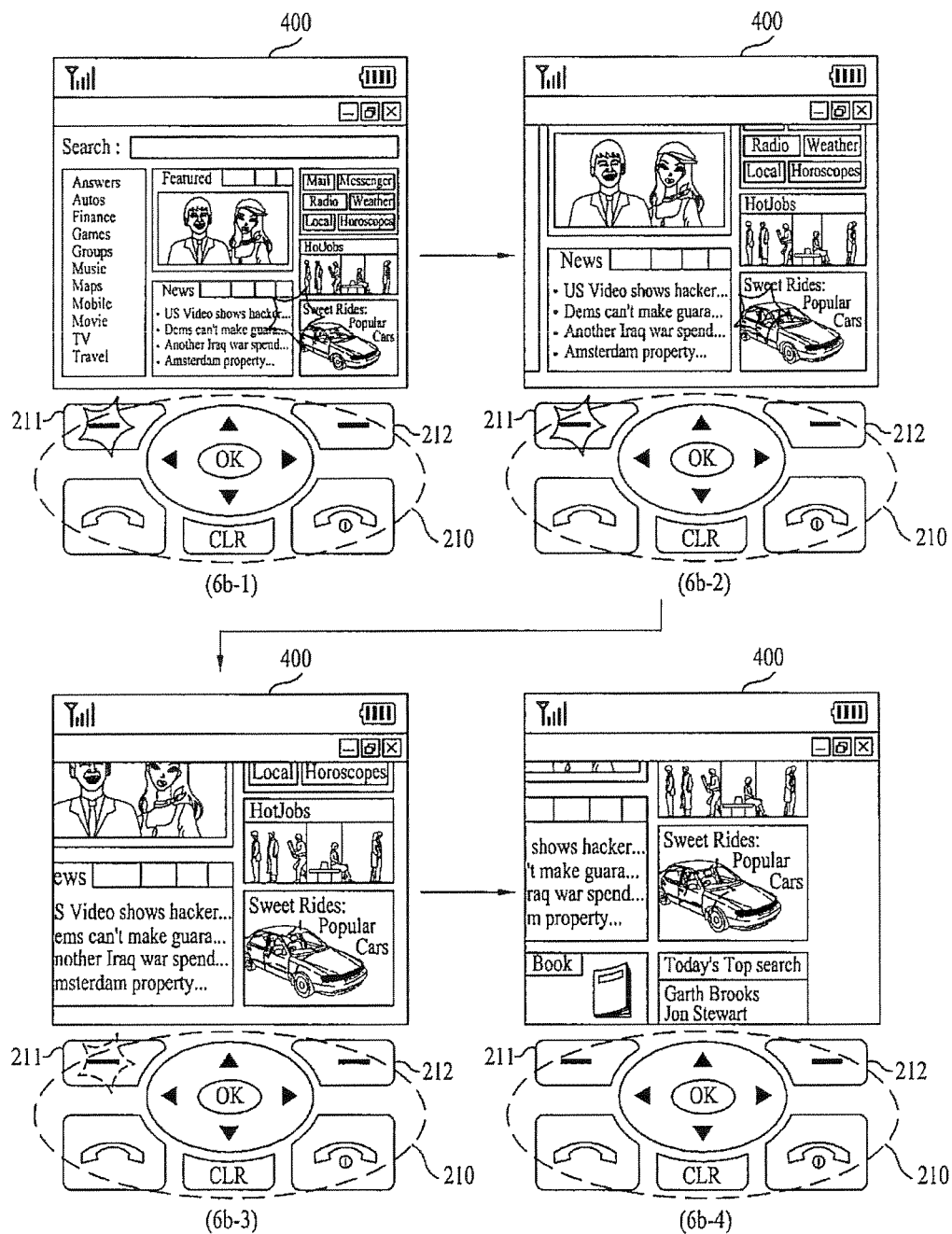

Hereinafter, embodiments for a controlling method applicable to the above-configured mobile terminal 100 are provided. It should be understood that the following embodiments may be used independently or bin combination with one another. FIGS. 1, 5, 6A, and 6B, illustrate a method for controlling a mobile terminal 100, in accordance with one or more embodiments. FIG. 5 is a flowchart of a method for controlling display of content on a touchscreen of mobile terminal 100, and FIGS. 6A and 6B are state diagrams of a display screen 400 on which the method illustrated in FIG. 5 may be implemented.

In the following, it is assumed that display 151 is configured to work as a touchscreen. In some embodiments, the touchscreen may be configured to work together with an underlying touchpad. For clarity, it is also assumed that a command for 'zoom-in' or 'zoom-out' may be given via first and second keys 211 and 212 provided to the first user interface unit 210 as shown in FIG. 6A (6a-1), for example.

In alternative embodiments, 'zoom-in' or 'zoom-out' functions may be implemented via a wheel input device, a joystick input device or a 3-way key input device provided in the user input unit 130. In the following, first and second keys 211 and 212, the wheel input device, the joystick input device, or the 3-way key input device may be generically referred to as a zoom adjuster for inputting the zoom-in or zoom-out commands.

In an exemplary embodiment, mobile terminal 100 accesses Internet via wireless communication unit 100. A zoom-in or zoom-out command may be given in the course of displaying a website of the internet on display screen 400. This is only for convenience of explanation of this invention. In other embodiments, display screen 400 may be configured to enable the zoom-in or zoom-out command to be given in the course of executing other functions (e.g., video viewer function).

In FIG. 6A, a webpage of a website accessed via the Internet is exemplarily displayed on display screen 400. A full-screen of the webpage is displayed on display screen 400 such that it is difficult to read the webpage. In accordance with one embodiment, a user of mobile terminal 100 selects, or presses, first key 211 to give a command for zooming in the display screen [S51]. Upon pressing first key 211, control unit 180 determines whether display screen 400, i.e., a certain point on the touchscreen is touched by the user [S52].

If the user does not touch a point on the touchscreen [S52], display screen 400, as shown in (6a-2) of FIG. 6A, is zoomed in toward its center [S53]. A zoom-in rate may be configured proportional to a press time or count of the first key 211. In (6a-3) of FIG. 6A, if the press time or the press count of first key 211 is incremented, the webpage is further zoomed in toward the center of the display screen.

If a user touches a point on display screen 400 [S52], display screen 400 is zoomed toward the touch point [S54]. Alternatively, the user may touch the point on display screen 400 and then press first key 211 to cause display screen 400 to be zoomed toward the touch point. As provided earlier, the zoom-in rate may be configured proportional to the number of times first key 211 is pressed or the length of time the first key 211 is pressed. Referring to (6b-3) of FIG. 6B, of the longer or the more often first key 211 is pressed, the webpage is further zoomed in toward the touch point.

If the user stops the zoom-in command by releasing pressing of first key 211, the zoomed-in display screen 400 is shifted such that the point, as shown in (6b-4) of FIG. 6B, is displayed at the center of display screen 400. It is unnecessary for the touched point to be a fixed point on the touchscreen. And, the touched signal point may be variable. So, if the point is shifted to a different point by the user in the course of the zoom-in, the zoom-in keeps being executed toward the shifted point.

In the foregoing description, the zoom-in process has been explained. The 'zoom-out' process may be implemented in a similar way with respect to second key 212 in the reverse manner. That is, a user may touch a point on the screen and then interact with the second key 212 by pressing it to cause the image displayed on the screen to be zoomed out in relation to the touch-point.

In the above description, the zoom-in is executed centering on the point in a manner that the zoom-in command and the touch for center designation (i.e., designation of the point) are simultaneously executed. Yet, it is unnecessary to simultaneously execute the zoom-in command and the zoom-in center designating touch. This is explained in detail with reference to FIGS. 7 and 8, in accordance with one or more embodiments.

Figure 7:
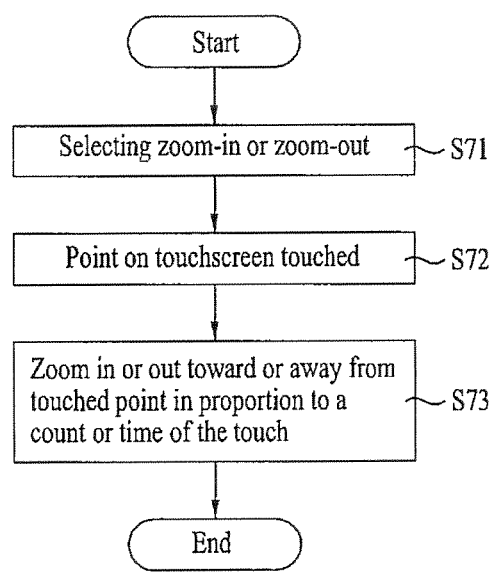
FIG. 7 is a flowchart of a method for controlling display of content on a touchscreen of a mobile terminal, in accordance with one embodiment.
Figure 8:
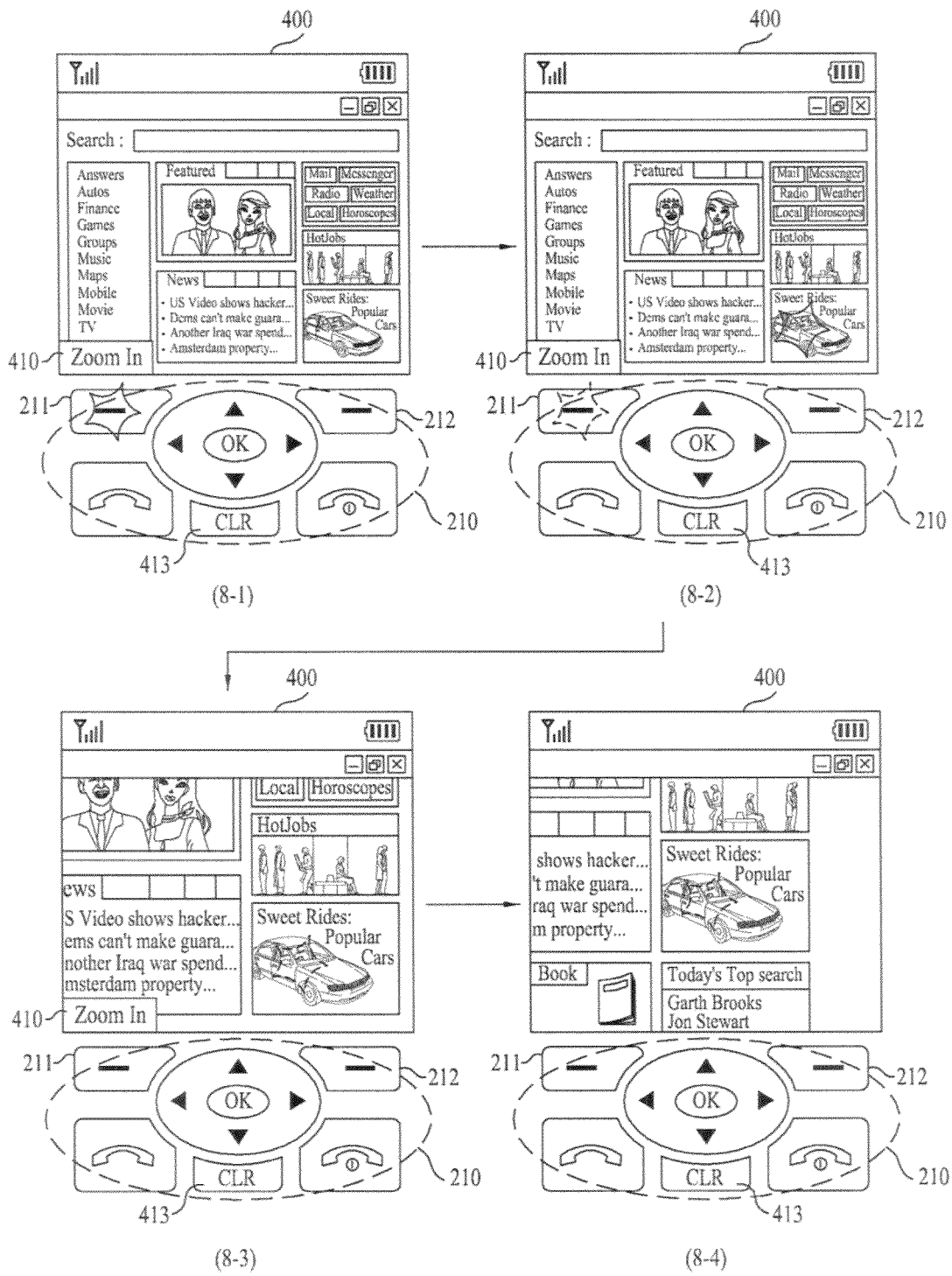
FIG. 8 is a state diagram for a display screen, in accordance with one embodiment.

FIG. 7 is a flowchart of a method for controlling display of content on a touchscreen of mobile terminal 100, and FIG. 8 is a state diagram of a display screen 400 on which the method for controlling display of content on a touchscreen of mobile terminal 100 may be implemented. In accordance with one embodiment, a user of mobile terminal 100 selects, or presses, a first key 211 [S71]. Once first key 211 is pressed, an indicator 410 which indicates that mobile terminal 100 is ready to receive a zoom in command, a shown in (8-1) of FIG. 8, is displayed on display screen 400.

Referring to (8-2) of FIG. 8, the user touches a point on display screen 400 while first key 211 is not pressed [S72]. Referring to (8-3) of FIG. 8, zoom-in is executed in a manner that display screen 400 is zoomed toward the touched point [S73]. In this case, the zoom-in may be configured to be executed in proportion to a time or count of the touch to the point.

Referring to (8-4) of FIG. 8, if the touch stops, the zoomed-in display screen is shifted to enable the point to lie at a center of display screen 400. Once the zoom-in is properly set, the user may press a 'CLR' key 413 to command that the zoom-in command be terminated. If desired, the user may shift the displayed content in a specific direction by touching and dragging display screen 400.

In the foregoing description, the zoom-in has been explained. This is identically applicable to 'zoom-out' away from the point except using second key 212 instead of using first key 211. It is apparent that the zoom-out should be easily understood based on the aforesaid description. Details of the zoom-out shall be omitted in the following description for clarity.

In the above description, the point is touched after pressing first key 211. It is noteworthy that the user may also touch the point before pressing first key 211. Generally, Internet webpages are configured in column format. If a user desires to zoom-in and take a closer look at a particular content in a column of a webpage, a user may desire to zoom in on a column basis as shown in FIGS. 9 and 10, in accordance with one or more embodiments.

Figure 9:
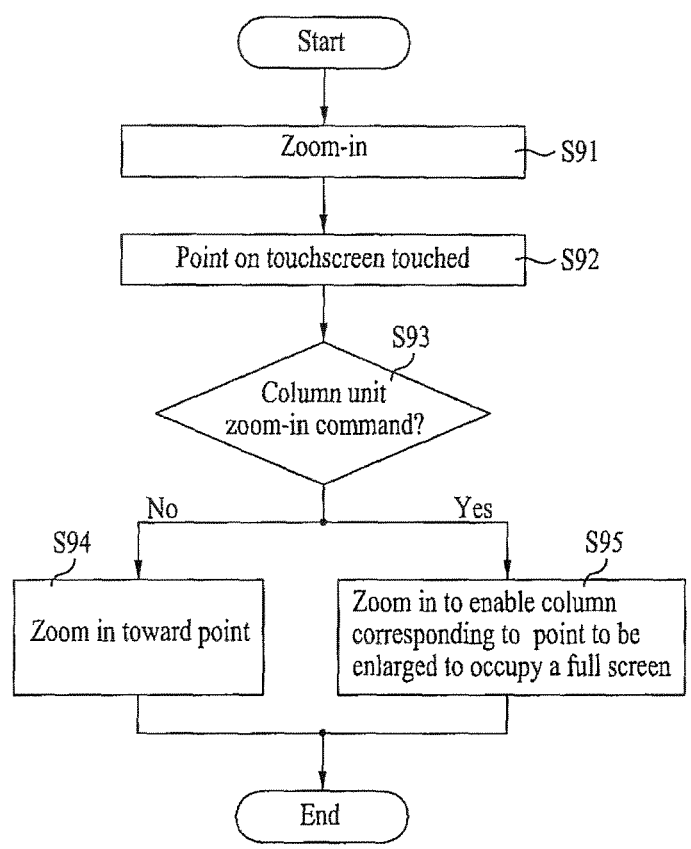
FIG. 9 is a flowchart of a method for controlling display of content on a touchscreen of a mobile terminal, in accordance with one embodiment.
Figure 10:
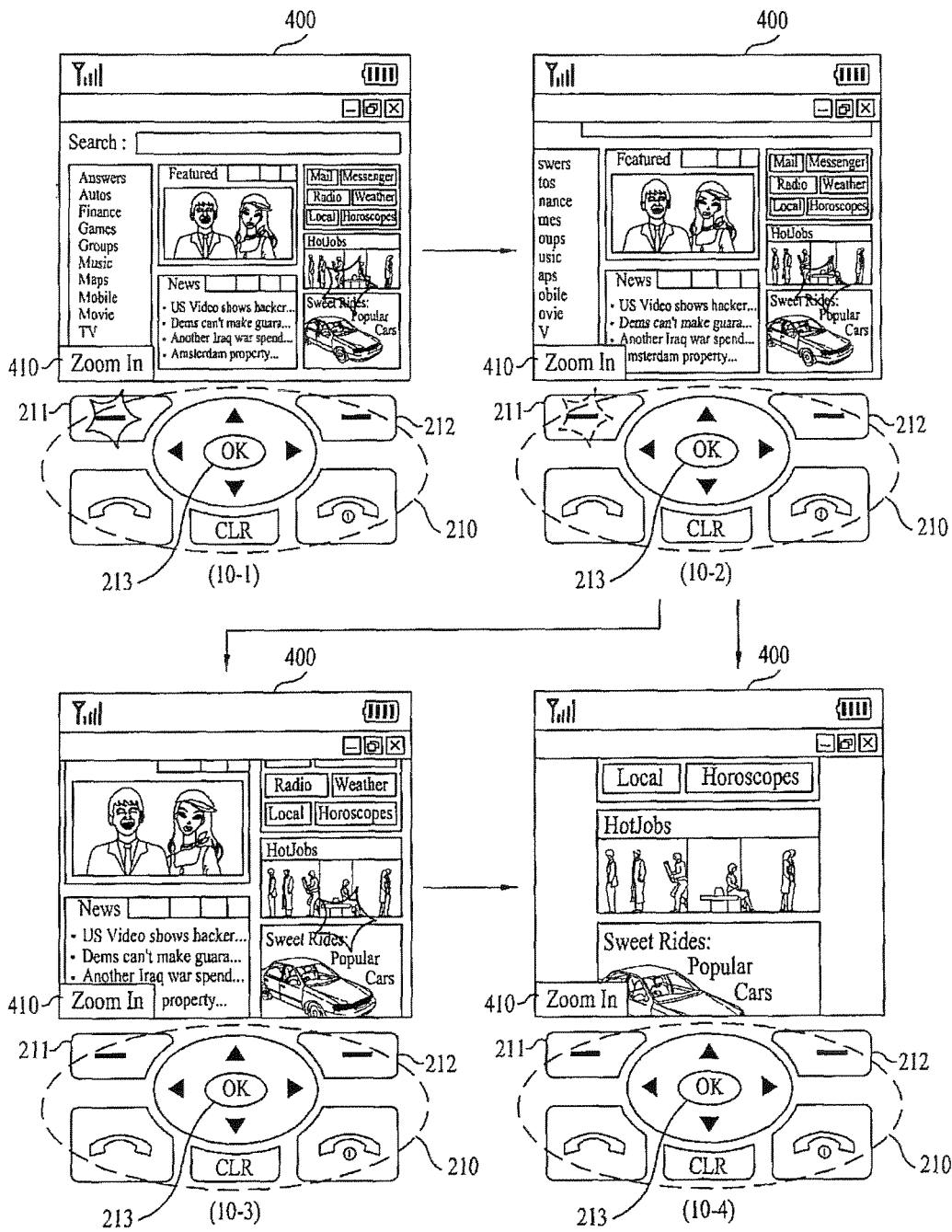
FIG. 10 is a state diagram for a display screen, in accordance with one embodiment.

FIG. 9 is a flowchart of a method for controlling display of content on a touchscreen of mobile terminal 100, and FIG. 10 is a state diagram of a display screen 400 on which the method for controlling display of content on a touchscreen of mobile terminal 100 may be implemented, in accordance with one or more embodiments.

In accordance with one embodiment, a user of mobile terminal 100 selects, or presses, first key 211 [S91]. In response to first key 211 being pressed, an indicator 410 is displayed which indicates that mobile terminal 100 is ready to receive a zoom command (see (10-1) of FIG. 10). If the user touches a point on display screen 400 [S92], the display screen 400 is zoomed in toward the point, as shown in (10-2) of FIG. 10.

As provided in further detail below, controller 180 determines whether a column unit zoom-in command is given by the user [S93]. If it is determined that the column unit zoom-in command is not given, display screen 400, as shown in (10-3) and (10-4) of FIG. 10, is gradually zoomed in toward the touched point [S94].

Referring to (10-2) of FIG. 10, the user may give the column unit zoom-in command by selecting an 'OK' button 213 of the second user input unit 210 while touching the point. In this case, the column unit zoom-in command is to execute a zoom-in action in a manner that a column to which the single touch belongs is enlarged to occupy the entire screen in the course of the zoom-in process.

If so, the control unit 180 determines that the column unit zoom-in command is given by the user [S93], and display screen 400 is shifted to zoom in to the image, as shown in (10-4) of FIG. 10, whereby the column to which the single touch belongs becomes the full screen [S95]. Hence, in case of browsing the webpage in a column format, e.g., a newspaper webpage, the user is able to promptly zoom in to a specific column to view a specific part with ease.

The column unit zoom-in command may be more easily implemented by using a push-enabling wheel input device or a 3-way key input device for the zoom-in. For example, a 2-directional rotation of a wheel of the wheel input device may correspond to the selections of first and second keys 211 and 212. A push of the wheel may correspond to a selection of 'OK' button 213. A 3-directional rotation of the wheel of the wheel input device or a 3-directional key inputs input of the 3-way key input device may correspond to selections of first key 211, second soft key 212 and 'OK' button 213.

In the above description, the zoom-in or zoom-out command is given via the zoom adjuster provided to the user input unit 130 as well as the touchscreen. In other embodiments, the zoom-in or zoom-out command may be given via soft key or icon type zoom adjuster implemented on the touchscreen. This is explained in detail with reference to FIG. 11.

Figure 11:
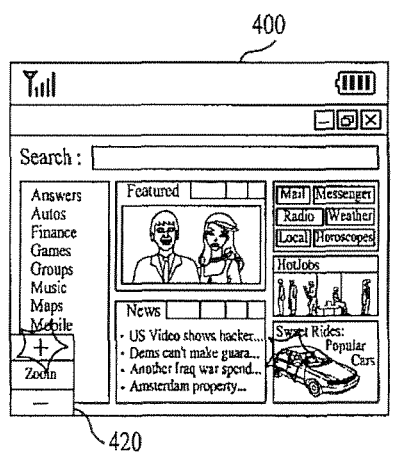
FIG. 11 is a state diagram for a display screen, in accordance with one embodiment.

FIG. 11 is a state diagram of a display screen 400 on which a method for controlling display of content on a touchscreen of mobile terminal 100 may be implemented, in accordance with one embodiment. Referring to FIG. 11, a touch-icon type zoom adjuster 420 is displayed on display screen 400. A shape of the touch icon is not limited to that shown in FIG. 11. In other embodiments, the shape of the touch icon may be implemented as one of a 2-way soft key set, a 3-way soft key set, a soft wheel, or the like.

Accordingly, if a point on a touchscreen is selected, a zoom-in or zoom-out action may be carried out by considering the point. In the related art, in order to zoom-in toward a specific point on the screen, it was necessary to repeat zoom-in and screen-shift command several times, which is troublesome to a user. Yet, the present invention settles the inconvenience completely.

The invention can take the form of an entirely hardware embodiment, an entirely software embodiment or an embodiment comprising both hardware and software elements. In one embodiment, the invention may be implemented in software, which may comprise firmware, resident software, microcode, and ACMs, without limitation.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

It should also be understood that the logic code, programs, modules, processes, methods and the order in which the respective steps of each method disclosed here are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A mobile terminal comprising:
a touchscreen for displaying content on the mobile terminal;
a zoom adjuster for providing one or more zoom-related functions; and
a control unit for controlling zooming on the content displayed on the touchscreen in response to a user selecting one of the one or more zoom-related functions provided by the zoom adjuster,
wherein the displayed content is zoomed selectively toward a zooming point on the touchscreen such that the zooming point becomes a center of the zooming, the zooming point comprising any one of a center of the touchscreen or a user-touched point,
wherein the displayed content is zoomed selectively toward the center of the touchscreen or the user-touched point in response to user input, and
wherein the center of the touchscreen is selected as the zooming point by manipulating the zoom adjuster without touching the touchscreen and the user-touched point is selected as the zooming point by touching the touchscreen.

2. The mobile terminal of claim 1, wherein the control unit further controls zooming-in or zooming-out on the content displayed on the touchscreen in response to the user selecting a zoom-in or a zoom-out function from among the one or more zoom-related functions provided by the zoom adjuster.

3. The mobile terminal of claim 1, wherein the control unit further controls zooming on the content displayed on the touchscreen in response to the user touching and dragging a point on the displayed content across the touchscreen.

4. The mobile terminal of claim 1, wherein selecting the one of the one or more zoom-related functions and touching the point on the touchscreen are performed approximately simultaneously.

5. The mobile terminal of claim 1, wherein the control unit further controls zooming on the content displayed on the touchscreen according to a number of times the user touches the touchscreen.

6. The mobile terminal of claim 1, wherein the control unit further controls zooming on the content displayed on the touchscreen to exclusively display a specific column from among a plurality of columns included in the content displayed on the touchscreen, wherein the user's touch on the touchscreen is associated with the specific column.

7. The mobile terminal of claim 6, wherein the specific column is displayed such that it occupies at least a substantial portion of the touchscreen.

8. The mobile terminal of claim 1, further comprising a user input unit for interacting with the zoom adjuster.

9. The mobile terminal of claim 8, wherein the user input unit comprises at least one of a key interface, a wheel interface, or a joystick interface.

10. The mobile terminal of claim 1, wherein the control unit provides at least one icon on the touchscreen that is related to the one or more zoom-related functions provided by the zoom adjuster.

11. The mobile terminal of claim 10, wherein the at least one icon is a touch-icon type zoom adjuster.

12. A method for controlling zoom on a touchscreen of a mobile terminal, the method comprising:
displaying content on the touchscreen;
providing one or more zoom-related functions; and
zooming on the content displayed on the touchscreen in response to a user selecting one of the one or more zoom-related functions,
wherein the displayed content is zoomed toward a zooming point on the touchscreen such that the zooming point becomes a center of the zooming, the zooming point comprising any one of a center of the touchscreen or a user-touched point,
wherein the displayed content is zoomed selectively toward the center of the touchscreen or the user-touched point in response to user input, and
wherein the center of the touchscreen is selected as the zooming point by manipulating a zoom adjuster provided at the mobile terminal without touching the touchscreen and the user-touched point is selected as the zooming point by touching the touchscreen.

13. The method of claim 12, wherein zooming on the content displayed on the touchscreen comprises zooming-in or zooming-out on the content displayed on the touchscreen in response to the user selecting a zoom-in or a zoom-out function from among the one of the one or more zoom-related functions.

14. The method of claim 12, wherein zooming on the content displayed on the touchscreen comprises shifting the content displayed on the touchscreen in response to the user touching and dragging a point on the displayed content across the touchscreen.

15. The method of claim 12, wherein selecting the one of the one or more zoom-related functions and touching the point on the touchscreen are performed approximately simultaneously.

16. The method of claim 12, wherein zooming on the content displayed on the touchscreen is performed according to a number of times the user touches the touchscreen.

17. The method of claim 12, wherein zooming on the content displayed on the touchscreen comprises exclusively displaying a specific column from among a plurality of columns included in the content displayed on the touchscreen, wherein the user's touch on the touchscreen is associated with the specific column.

18. The method of claim 17, wherein zooming on the content displayed on the touchscreen further comprises displaying the specific column such that it occupies at least a substantial portion of the touchscreen.

19. The method of claim 12, further comprising providing a user interface for selecting the one of the one or more zoom-related functions.

20. The method of claim 19, wherein the user interface comprises at least one of a key interface, a wheel interface, or a joystick interface.

21. The method of claim 12, further comprising providing at least one icon on the touchscreen that is related to the one or more zoom-related functions.

22. The method of claim 21, wherein the at least one icon is a touch-icon type zoom adjuster.

23. The mobile terminal of claim 10, wherein the at least one icon indicates that the mobile terminal is ready to receive an input related to the one or more zoom-related functions.

24. The mobile terminal of claim 1, wherein:
selecting the one of the center of the touchscreen and the user-touched point comprises receiving a touch input at a point on the displayed content; and
the displayed content is zoomed toward the user-touched point in response to the touch input.

25. The mobile terminal of claim 1, wherein the displayed content is zoomed toward the center of the touchscreen when the user input is the manipulation of the zoom adjuster without touching the touchscreen.

26. The mobile terminal of claim 1, wherein the displayed content is zoomed toward the user-touched point when the user input is the touching of the touchscreen.

27. The mobile terminal of claim 1, wherein the zoom adjuster comprises an icon or key displayed on the touchscreen.

28. The mobile terminal of claim 1, wherein the control unit is configured to determine whether a certain point on the displayed content is touched when the one of the one or more zoom-related functions is selected.

29. The mobile terminal of claim 28, wherein the control unit is further configured to cause zooming toward the center of the touchscreen when it is determined that no point on the displayed content has been touched.

30. The mobile terminal of claim 29, wherein the control unit is further configured to cause zooming toward the user-touched point when it is determined that the certain point has been touched.

31. The mobile terminal of claim 30, wherein the control unit is further configured to cause shifting the content zoomed toward the user-touched point on the touchscreen such that the user-touched point is shifted to the center of the touchscreen when the zooming is finished.

32. The mobile terminal of claim 31, wherein the zooming is finished when touching the certain point stops.

33. The mobile terminal of claim 31, wherein the control unit is further configured to cause further shifting of the content zoomed and shifted in response to dragging the displayed content.

* * * * *